(12) United States Patent
Hennessy

(10) Patent No.: US 10,483,798 B2
(45) Date of Patent: Nov. 19, 2019

(54) WIRELESS PORTABLE CHARGER AND DISPLAY PANEL FOR A WIRELESS CHARGEABLE HAND HELD DEVICE

(71) Applicant: Joseph James Hennessy, Reedsburg, WI (US)

(72) Inventor: Joseph James Hennessy, Reedsburg, WI (US)

( * ) Notice: Subject to any disclaimer, the term of this patent is extended or adjusted under 35 U.S.C. 154(b) by 0 days.

(21) Appl. No.: 16/241,241

(22) Filed: Jan. 7, 2019

(65) Prior Publication Data

US 2019/0214849 A1    Jul. 11, 2019

Related U.S. Application Data

(60) Provisional application No. 62/614,837, filed on Jan. 8, 2018.

(51) Int. Cl.
*H02J 50/10*  (2016.01)
*H02J 7/02*   (2016.01)
*H02J 7/00*   (2006.01)

(52) U.S. Cl.
CPC ............ *H02J 50/10* (2016.02); *H02J 7/0044* (2013.01); *H02J 7/0052* (2013.01); *H02J 7/025* (2013.01)

(58) Field of Classification Search
CPC ........ H02J 50/10; H02J 7/0044; H02J 7/0052; H02J 7/025
See application file for complete search history.

(56) References Cited

U.S. PATENT DOCUMENTS

| 2002/0043960 | A1* | 4/2002 | Janik | G06F 1/1632 |
| | | | | 320/128 |
| 2004/0090773 | A1* | 5/2004 | Bryan | A45C 3/08 |
| | | | | 362/156 |
| 2008/0258679 | A1* | 10/2008 | Manico | H02J 50/10 |
| | | | | 320/106 |
| 2010/0213895 | A1* | 8/2010 | Keating | H02J 7/025 |
| | | | | 320/108 |
| 2013/0300355 | A1* | 11/2013 | Jung | H02J 7/0027 |
| | | | | 320/108 |
| 2015/0015182 | A1* | 1/2015 | Brandtman | H02J 7/0027 |
| | | | | 320/103 |
| 2018/0131201 | A1* | 5/2018 | Calhoun | H04W 4/38 |
| 2018/0254670 | A1* | 9/2018 | Tsukamoto | H02J 50/20 |

FOREIGN PATENT DOCUMENTS

| WO | WO-2014066990 A1 * | 5/2014 | ............ G09F 7/10 |
| WO | WO-2016029251 A1 * | 3/2016 | ............ H02J 7/025 |

OTHER PUBLICATIONS

The best wireless chargers for iPhone, Oct. 12, 2018, Macworld, https://www.macworld.com/article/3243053/iphone-ipad/the-best-wireless-chargers-for-your-iphone.html.

* cited by examiner

*Primary Examiner* — Devan A Sandiford
(74) *Attorney, Agent, or Firm* — R. William Graham

(57) ABSTRACT

A wireless portable phone charger with display panel includes a housing with a rechargeable power source for delivering power to a wireless chargeable hand held device and improves the re-charging experience by allowing a person to wirelessly charge their phone or other electronic device while viewing a display.

12 Claims, 7 Drawing Sheets

WIRELESS PORTABLE CHARGER AND DISPLAY PANEL FOR A WIRELESS CHARGEABLE HAND HELD DEVICE

BACKGROUND OF THE INVENTION

Field of Invention

The instant invention relates to cell phone charging. More particularly, the invention relates to improved cell phone and electronic device charging stations.

Prior Art

Currently, there are numerous cell phone charging devices. For example, there are portable power stations which have an AC power source connected to a wireless charging pad. Existing solutions operate by means of a power port that a phone or electronic device to which it can be connected.

In many public or private environments, such as restaurants and other retail establishments, it is not readily possible to provide all patrons means for recharging their device(s) when it reaches a low on battery power state. As a patron's device loses battery power, he or she is more likely to leave the establishment in search of a charging solution.

From a business perspective, this results in loss of revenue. Attempts have been made to solve this problem by hard-wiring power outlets and USB charge ports into the structure of the establishment. This is expensive and often not a workable solution. As an example, there may be location where patrons sit, such as a remote table in a dining area that has no power available or in a rural or undeveloped area where resources are limited and hard wiring such tables or locations is not a practical solution.

There remains a need to improve charging stations and expand their ability to meet the needs of such environments. The present invention improves the re-charging experience by allowing a patron recharge their device in such environments.

SUMMARY OF INVENTION

As stated above, patrons of restaurants and other retail establishments who carry cellular phones or other portable electronic devices, e.g., tablets, often run low on battery power. As a patron loses battery power to their device, the patron seeks to recharge the device. If no means to recharge is available, the patron is more likely to leave the establishment in search of a phone charging solution. This results in loss of revenue. Attempts have been made to solve this problem by hard-wiring power outlets and USB charge ports into the structure of the establishment. However, patrons are sometimes sitting at a remote table in a dining area that has no power available. The instant invention solves this problem.

It is an object to improve charging stations for wireless devices.

Another object is to provide a wireless charging station for wireless rechargeable electronic devices.

Still another object is to enable readily disposable charging stations to be disposed at on any suitable support surface, such as a table top, in an establishment providing a charger port or wireless charger.

Yet another object is to improve the re-charging experience by allowing a patron to wirelessly charge their phone or other electronic device.

Another object is to provide a charging station with a promotional item for display purposes.

A further object is to provide a charging station with a display, which can be electronic or printed graphic.

Accordingly, the present invention is directed to a wireless charging device. The wireless charging device has a housing having a wireless charging receiving surface of a sufficient size to receive the wireless chargeable hand held device. A wireless charging coil is operably disposed in the housing having adjacent the wireless charging receiving surface. In one embodiment, a power source is provided and operably connected to the housing. For example, a rechargeable battery can be operably disposed in the housing or an AC power input can be provided. An electronic controller board is operably disposed in the housing connected to the power source and the wireless charging coil and a power switch is operably connected to the electronic controller board for actuating on/off flow of electrical power.

The wireless portable charger can include at least one USB port operably connected to the electronic controller board, and a power input operably connected to the electronic controller board. The wireless portable charger can further include a non-horizontal surface connecting to and extending about the wireless charging receiving surface. A display panel can be connected to the housing.

In one embodiment, an LED light board can operably connect to the electronic controller board and is disposed in the housing to illuminate outward therefrom, preferably on the display panel. An LED light switch can be provided on the housing operably interconnecting the electronic controller board and the LED light board.

In another embodiment, the display panel can be an electronic display such as a LCD panel. The electronic controller board can be programmed to detect when the wireless chargeable hand held device is disposed on the wireless charging receiving surface and deliver power to the wireless chargeable hand held device.

Further aspects and objects of the invention can be understood and appreciated from the attached drawings and following description.

DETAILED DESCRIPTION OF THE INVENTION

Figure 1:
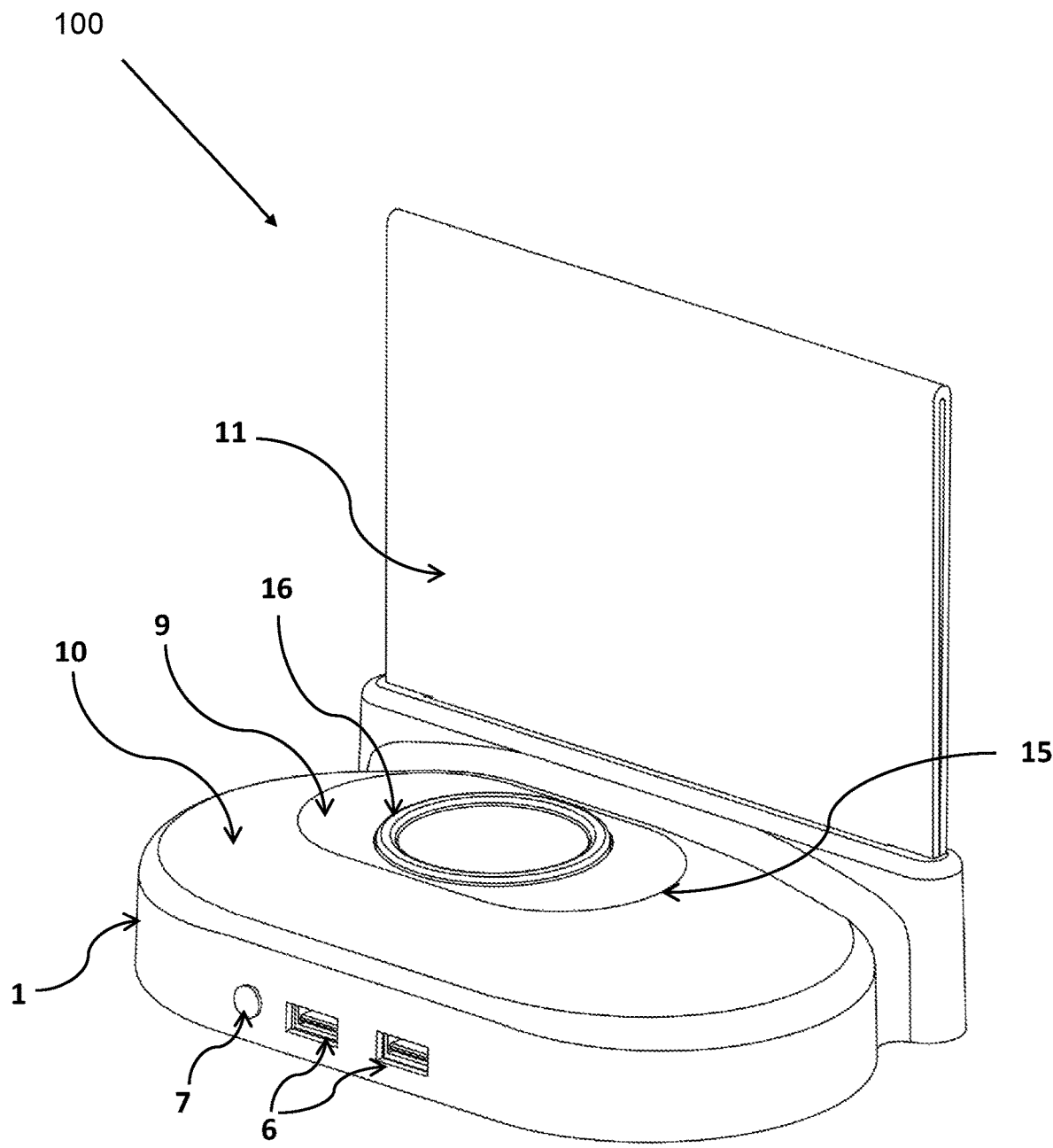
FIG. 1 shows a front perspective view of an embodiment of the invention.
Figure 2:
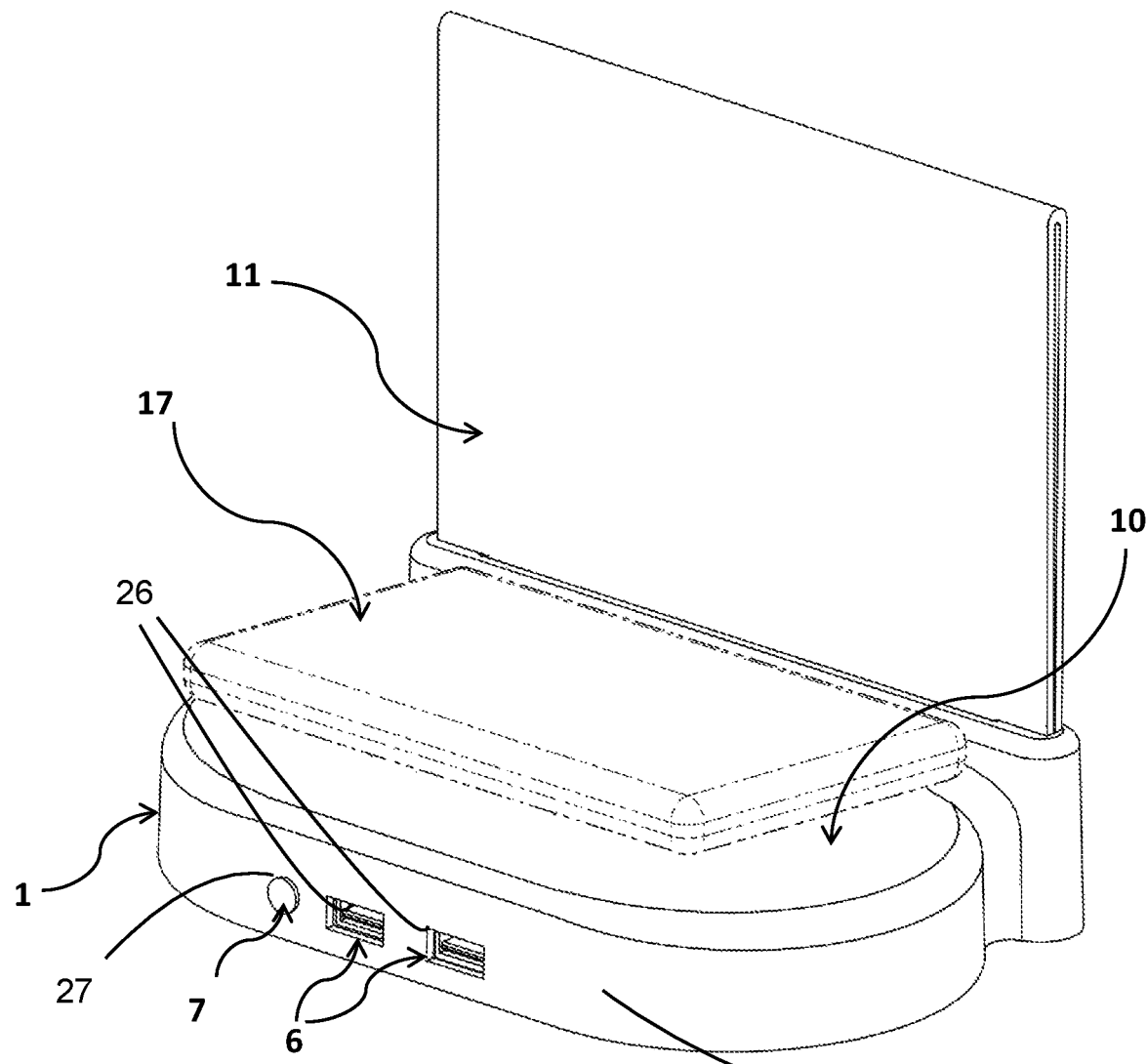
FIG. 2 shows a front perspective view of an embodiment of the invention with an electronic device thereon.
Figure 3:
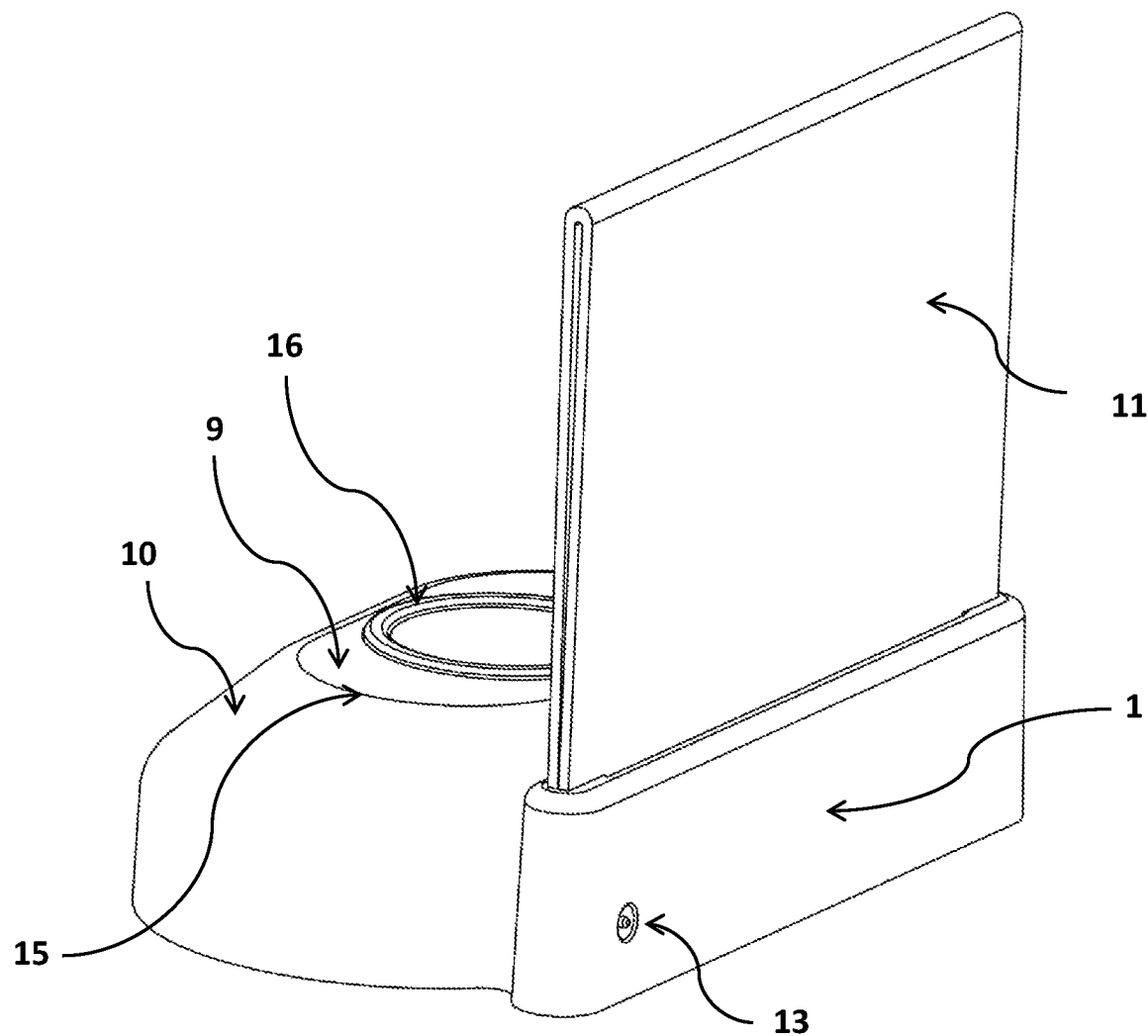
FIG. 3 shows a back perspective view of an embodiment of the invention.
Figure 4:
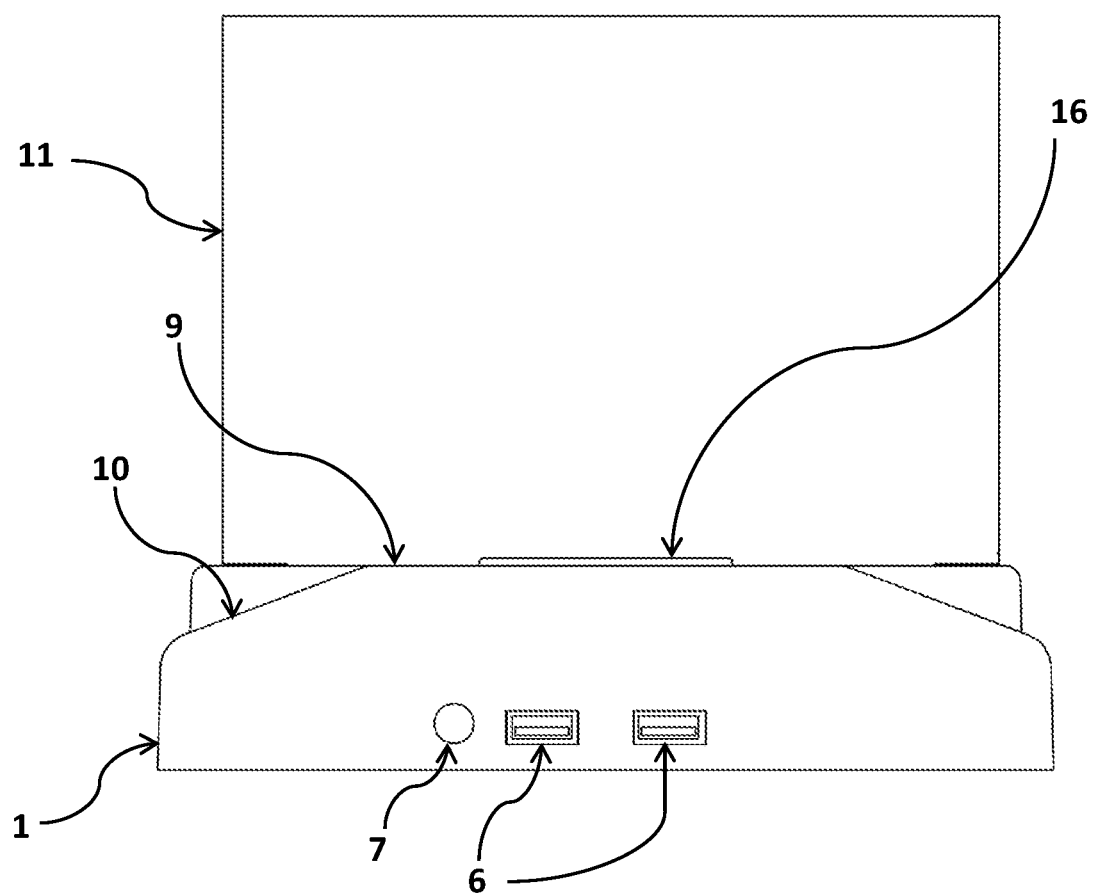
FIG. 4 shows a front view of an embodiment of the invention.
Figure 5:
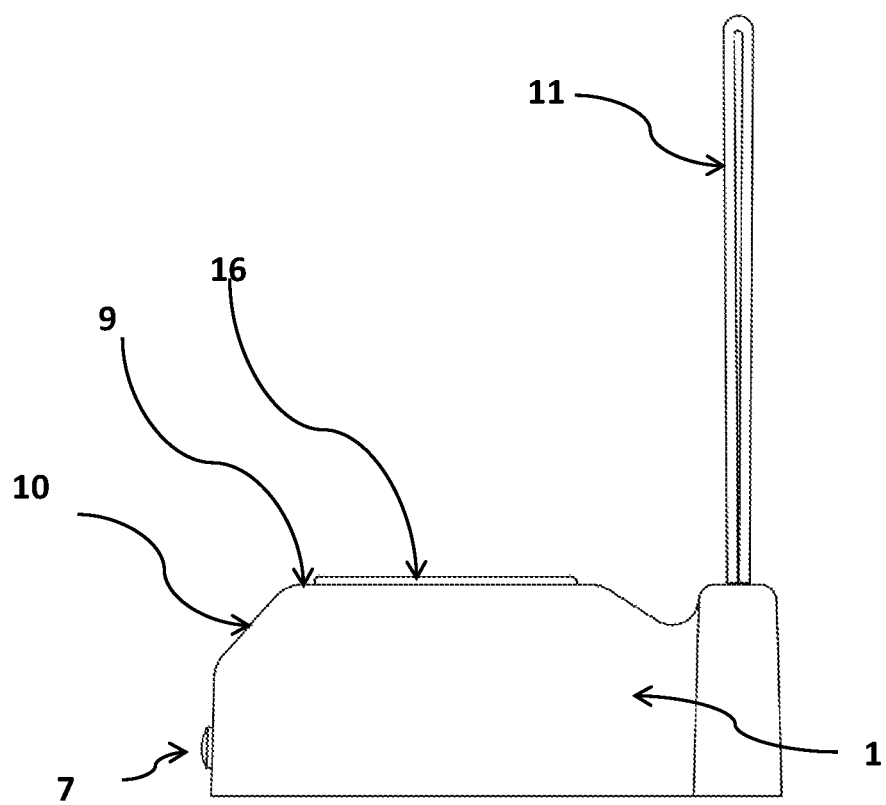
FIG. 5 shows a right side view of an embodiment of the invention.
Figure 6:
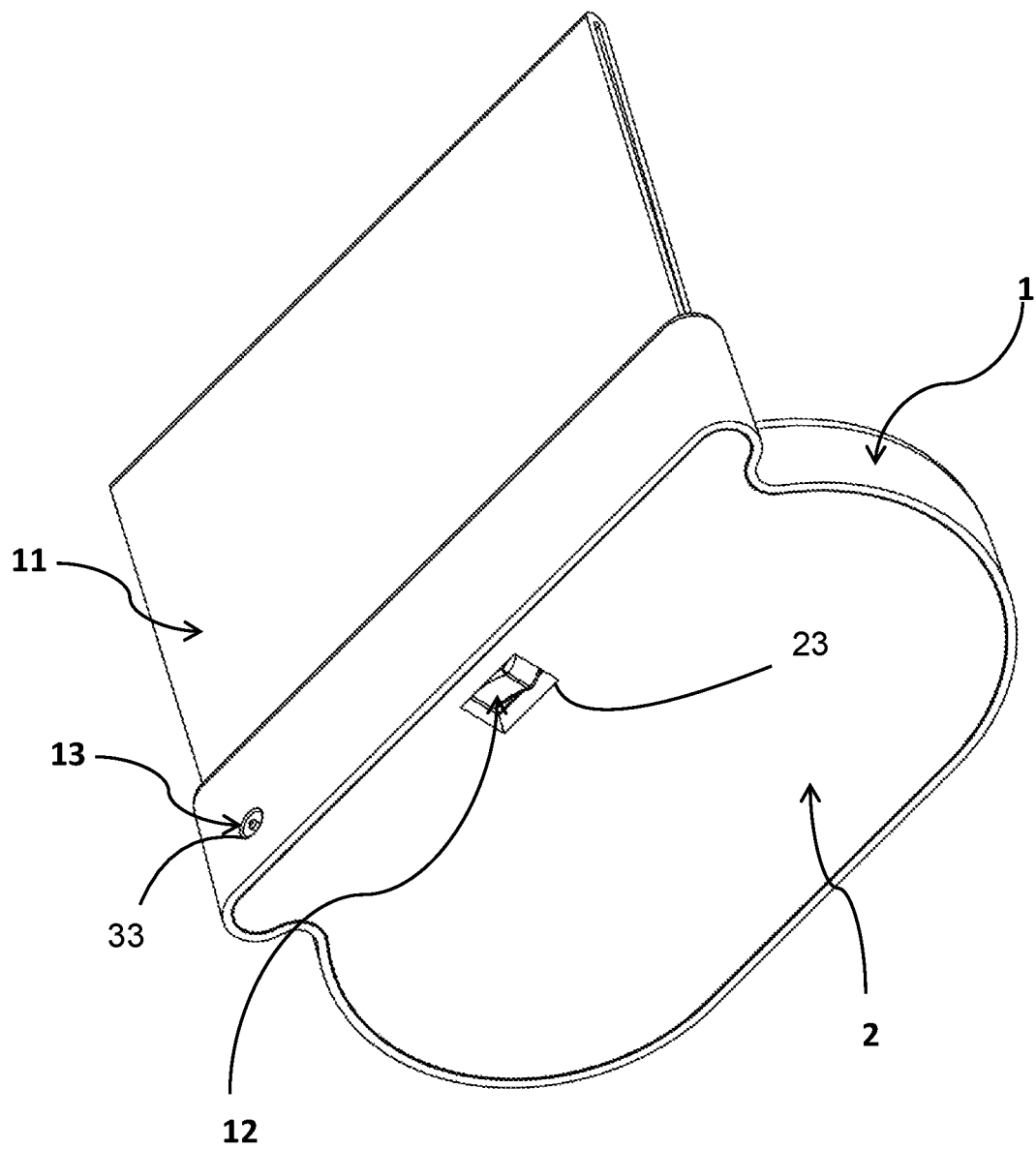
FIG. 6 shows a bottom perspective view of an embodiment of the invention.
Figure 7:
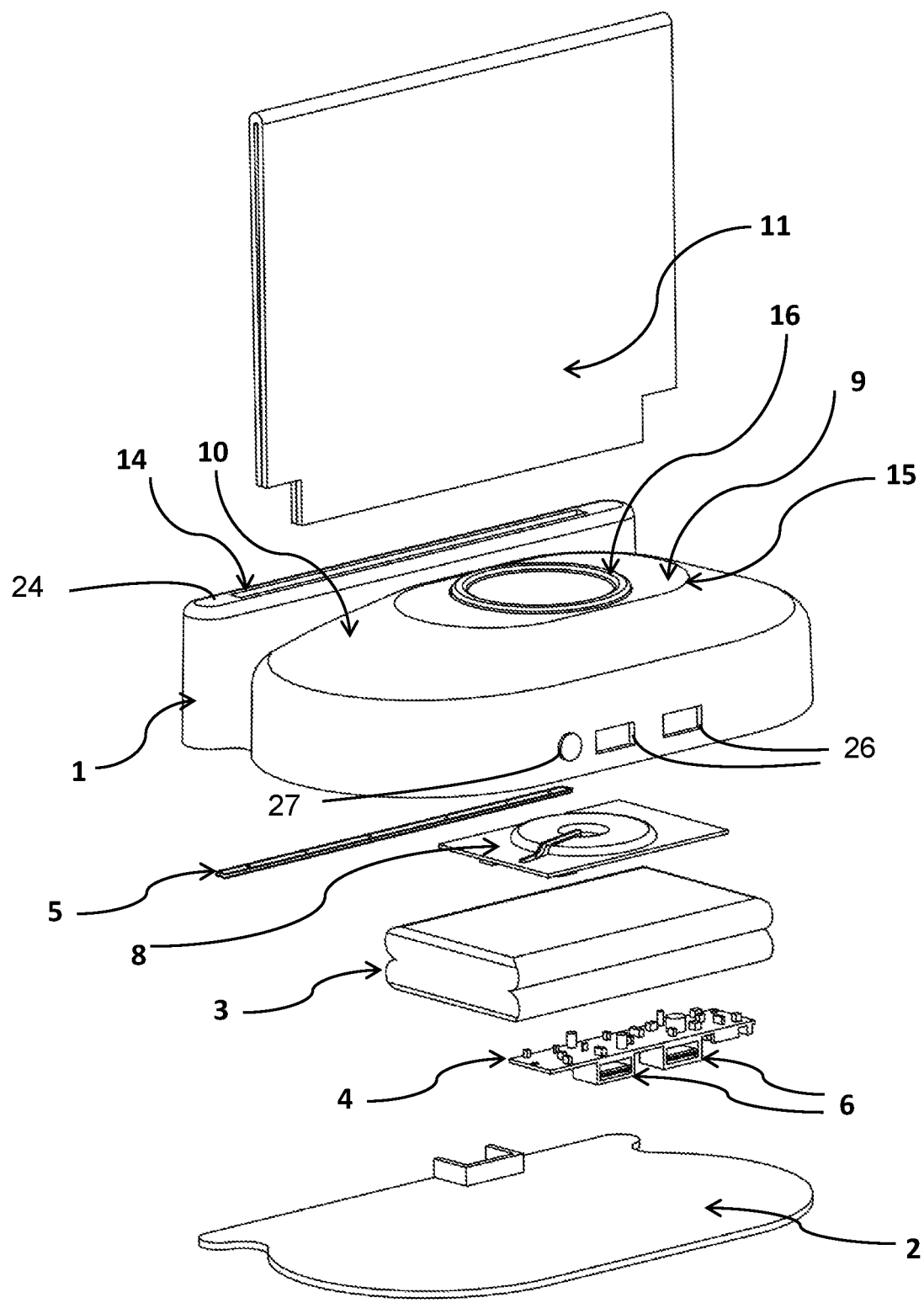
FIG. 7 shows an exploded perspective view of an embodiment of the invention.

Referring now to the drawings, the wireless portable phone charger with display panel of the present invention is generally designated by the numeral 100. The claimed invention differs from what currently exists. This invention is an improvement on what currently exists for charging phones and other electronic devices.

The present invention allows power to be available at any table, for example. One contemplated use is in a restaurant, or similar retail establishment, without the need for infrastructure or hard-wiring. Another use contemplated is for personal use in one's home or office as will be apparent hereinafter.

The available power can be used to charge phones and other electronic devices. The invention's ability to charge a phone or other electronic device via wireless technology does not exist as currently devised.

Trending phones and other electronic devices include wireless charging technology. Wireless charging technology is more convenient than using cables and power ports. Many times the user of such device is not carrying a charging cable.

The present invention improves the re-charging experience by allowing a patron to wirelessly charge their phone or other electronic device with a display of an image above the device. The present invention can be used as a personal displayed image or a promotional item such as an advertisement.

The wireless portable phone charger with display panel 100 includes the following components:
1. Outer Shell
2. Shell Base
3. Rechargeable Battery Pack
4. Electronic controller board
5. LED Light Board
6. USB Output Charge Port
7. Start Button
8. Wireless Charging Coil
9. Horizontal Wireless Charging Receiving Surface
10. Non-horizontal Surface
11. Menu and Display Holder
12. LED Light Switch
13. Power Input Port
14. Panel Holder Slot
15. Perimeter
16. Non-Slip Surface
21. Front side wall
23. Light Switch opening
24. Top surface
26. USB openings
27. Start/stop button opening
33. Power input port opening A housing is made of an outer shell 1 creates an enclosure together with shell base 2. The shell base 2 can be connected to a bottom of outer shell 1 and components described hereinafter are operably disposed therein. The outer shell 1 includes one or more USB openings 26 and a start/stop button opening 27 which are shown here on a front side wall 21 of the outer shell 1, a panel holder slot 14 shown here in top surface 24 of the outer shell 1 and a power input port opening 33 shown here on a back side 25 of the outer shell 1. The particular locations of the openings 26, 27, 33 and slot 14 are exemplary.

Additionally, a wireless horizontal charging receiving surface 9 can be provided as part of the outer shell 1 and can be disrupted by a non-slip surface 16. Non-slip surface 16 protrudes above the wireless horizontal charging receiving surface 9. In this embodiment, the non-slip surface 16 is a circular configuration though it is contemplated other configurations can be employed. Material for the non-slip surface 16 preferably has a higher coefficient of friction than outer shell 1.

The wireless horizontal charging receiving surface 9 connects to a non-horizontal surface 10 at a perimeter 15. Perimeter 15 can be, for example, circular, oval or rectangular in shape. The perimeter 15 dimensions are preferably large enough to enable the disposal of a wireless rechargeable electronic device 17 on the receiving surface 9, for example, e.g., about 56 mm×105 mm, but other sizes are contemplated to receive a predetermined device. The perimeter 15 is preferably no greater in diameter than those contemplated to accomplish the intended result. The non-horizontal surface 10 can be tapered sufficiently to preclude other items from resting on the surface thereof, i.e., this promotes a slip surface to prevent drinks from being placed on the outer shell 1.

Electronic controller board 4 includes a pair of USB ports 6 operably connected thereto and is operably connected to a power source which can be a rechargeable battery pack 3 or an AC power input port 13. The battery pack 3 can be a lithium type, for example. A wireless charging coil 8 is operably connected to the electronic controller board 4 in a manner to be energized therethrough and is disposed adjacent a back side of the wireless horizontal charging receiving surface 9. An LED light board 5 is operably disposed beneath the panel holder slot 14 and is operably connected to an LED light switch 12 which is operably connected to the battery pack 3 and actuates the LED light board 5 on and off. The light switch 12 is disposed in a light switch opening 23 of shell base 2.

A start/stop button 7 is operably connected to the electronic controller board 4 to actuate on/off the wireless portable phone charger with display panel 100. An AC power input port 13 is provided and operably connected to the electronic controller board 4 to deliver power and enable recharging of the battery pack 3.

Outer Shell 1 has a panel holder slot 14 on the outside top surface 24 that enables the insertion of display panel 11. The display panel 11 can be an LCD screen or a holder for receiving a photo or advertisement. In this way, a menu or other display literature piece can be disposed therein and illuminated from beneath with the aid of the LED light board 5.

As mentioned, the wireless charging surface 9 enables users to place a wireless charging enabled device on top of the outer shell 1 and allows enough surface area to adjust the alignment of wireless charging coil 8 with the charging coil receiver of a phone or other electronic device.

Wireless charger coils and receiver coils in phones and other electronic devices align concentrically to allow for an efficient synchronization and charging activity between the charger coil and the receiver coil. Wireless charging surface 9 is sized large enough to allow for the placement, balance, and adjustment of a phone or electronic device while it is also sized small enough to prevent unwanted items placed upon it such as beer mugs and drink glasses.

The power source, e.g., battery pack 3 or AC power input port 13, holds electrical energy delivered from the electronic controller board 4. The electronic controller board 4 receives power from the power input port 13 and delivers a charge to battery pack 3, energizes the LED Light Switch 12, energizes the start button 7 and energizes USB output charge ports 6.

When start button 7 is activated, electronic controller board 4 delivers power to the wireless charging coil 8 for a set amount of time. The electronic controller board 4 is preprogrammed such that if a predetermined amount of time is exceeded before a phone or other electronic device has been aligned with, and begun drawing power from wireless charging coil 8, the electronic controller board 4 stops delivering power to wireless charging coil 8.

Use of the wireless portable phone charger with display panel 100 is as follows. The wireless portable phone charger with display panel 100 for smart phones or other electronic devices may be placed on a table or bar in a restaurant or similar retail establishments. The wireless portable phone charger with display panel 100 allows for charging patron's phones and electronic devices while enabling the establishment to also promote their business. The portable wireless portable phone charger with display panel 100 contains a battery bank that stores energy for discharging into, and refreshing, the charge of smart phones and other electronic devices.

The personnel of an establishment offering a wireless portable phone charger as a service refreshes the battery bank within the charger periodically. When the battery bank within the wireless portable phone charger with display panel 100 is refreshed, the wireless portable phone charger with display panel 100 can be placed on a table or bar or other surface within the establishment. As a patron encounters diminishing power on his or her smart phone or other electronic device, he or she has the opportunity to use the wireless portable phone charger with display panel 100 to refresh the charge on their device.

It is important to configure the shell base 2 so that a wireless charging coil 8 can be positioned in a close proximity with a patron's smart phone or other electronic device. Also, induction transmission is needed to enable the wireless technology to be completed and induction transmission can be hindered by metallic materials. So, preferable materials of manufacturing the Outer Shell 1 are non-metallic polymers. Not all elements of the present invention are necessary. Elements that can be optional are the power input port 13, LED light board 5, holder slot 14, LED light switch 13, USB output charge port 6, and non-horizontal surface 10.

The present invention can be used as a promotional item for display purposes. Although the foregoing description is specific, it should not be considered as a limitation on the scope of the invention, but only as an example of the preferred embodiment. Many variations are possible within the teachings of the invention. For example, different shapes, materials, dimensions, etc., can be used unless specifically indicated otherwise. The relative positions of the elements can vary. Therefore, the scope of the invention should be determined by the appended claims and their legal equivalents, not by the examples given.

What is claimed is:

1. A wireless portable charger and display panel for a wireless chargeable hand held device, which comprises:
    a housing having a generally horizontal surface which includes a wireless charging receiving surface of a sufficient size only to receive the wireless chargeable hand held device and having a non horizontal surface extending outward from said generally horizontal surface configured to substantially inhibit placement of another object thereon from a diminished area of said generally horizontal surface beyond said wireless charging receiving surface throughout said non horizontal surface;
    a generally vertical display panel connected to said housing;
    a wireless charging coil operably disposed in said housing having adjacent said wireless charging receiving surface;
    a power source;
    an electronic controller board operably disposed in said housing connected to said power source and said wireless charging coil rechargeable; and
    a power switch operably connected to said electronic controller board for actuating on/off flow of electrical power.

2. The wireless portable charger of claim 1, which includes at least one USB port operably connected to said electronic controller board.

3. The wireless portable charger of claim 1, which includes a power input operably connected to said electronic controller board.

4. The wireless portable charger of claim 1, wherein said non-horizontal surface includes a slanted surface connecting to and extending about said generally horizontal receiving surface and connects to a generally vertical side wall of said housing.

5. The wireless portable charger of claim 1, which includes an LED light board operably connected to said electronic controller board and disposed in said housing to illuminate outward therefrom.

6. The wireless portable charger of claim 1, wherein said electronic controller board is programmed to detect when the wireless chargeable hand held device is disposed on said wireless charging receiving surface and deliver power to the wireless chargeable hand held device.

7. The wireless portable charger of claim 1, which includes an LED light switch on said housing operably interconnecting said electronic controller board and said LED light board.

8. The wireless portable charger of claim 1, wherein said display panel is removably connected to said housing.

9. The wireless portable charger of claim 1, wherein said power source is a rechargeable battery operably disposed in said housing.

10. The wireless portable charger of claim 1, wherein said power source is an AC power input operably disposed in said housing.

11. The wireless portable charger of claim 1, wherein said display panel includes an LCD panel.

12. The wireless portable charger of claim 1, wherein said display panel includes a holder for a printed graphic.

* * * * *